US011620576B1

United States Patent
Tao et al.

(10) Patent No.: US 11,620,576 B1
(45) Date of Patent: Apr. 4, 2023

(54) SYSTEMS AND METHODS FOR KNOWLEDGE TRANSFER IN MACHINE LEARNING

(71) Applicant: Amazon Technologies, Inc., Seattle, WA (US)

(72) Inventors: Yunzhe Tao, Bothell, WA (US); Sahika Genc, Fall City, WA (US); Tao Sun, Bellevue, WA (US); Sunil Mallya Kasaragod, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 16/908,359

(22) Filed: Jun. 22, 2020

(51) Int. Cl.
  *G06N 20/00* (2019.01)
  *G06N 5/02* (2006.01)
  *G06N 5/045* (2023.01)
  *G06N 20/20* (2019.01)

(52) U.S. Cl.
  CPC ............. *G06N 20/00* (2019.01); *G06N 5/045* (2013.01); *G06N 20/20* (2019.01)

(58) Field of Classification Search
  CPC ......... G06N 20/00; G06N 5/045; G06N 20/20
  See application file for complete search history.

(56) References Cited

U.S. PATENT DOCUMENTS

| | | | | |
|---|---|---|---|---|
| 2018/0342004 A1* | 11/2018 | Yom-Tov | ............... | G06N 7/005 |
| 2019/0272465 A1* | 9/2019 | Kimura | ................ | G06N 3/0472 |
| 2020/0272905 A1* | 8/2020 | Saripalli | ................ | H03M 7/70 |
| 2020/0357296 A1* | 11/2020 | Sharma | .............. | G06Q 50/2057 |
| 2021/0150407 A1* | 5/2021 | Xu | ........................... | G06N 5/02 |

OTHER PUBLICATIONS

Bharathan Balaji, et al., "DeepRacer: Educational Autonomous Racing Platform for Experimentation with Sim2Real Reinforcement Learning", arXiv:1911.01562v1, Nov. 5, 2019, pp. 1-9.
Andre Barreto, et al., "Transfer in Deep Reinforcement Learning Using Successor Features and Generalized Policy Improvement", in Proceedings of the 35th International Conference on Machine Learning, PMLR 80, 2018, pp. 1-10.
Andre Barreto, et al., "Successor Features for Transfer in Reinforcement Learning", arXiv:1606.05312v2, Apr. 12, 2018, pp. 1-24.
Diana Borsa, et al., "Universal Successor Features Approximators", arXiv:1812.07626v1, Dec. 18, 2018, pp. 1-24.
Jia Deng, et al., "ImageNet: A Large-Scale Hierarchical Image Database", In 2009 IEEE Conference on Computer Vision and Pattern Recognition, pp. 248-255.

(Continued)

*Primary Examiner* — Abdullahi E Salad
(74) *Attorney, Agent, or Firm* — Robert C. Kowert; Kowert, Hood, Munyon, Rankin & Goetzel, P.C.

(57) ABSTRACT

A training system may create and train a machine learning model with knowledge transfer. The knowledge transfer may transfer knowledge that is acquired by another machine learning model that has been previously trained to the machine learning model that is under training. The knowledge transfer may include a combination of representation transfer and instance transfer, the two of which may be performed alternatingly. The instance transfer may further include a filter mechanism to selectively identify instances with a satisfactory performance to implement the knowledge transfer.

20 Claims, 7 Drawing Sheets

(56) References Cited

OTHER PUBLICATIONS

Jacob Devlin, et al., "BERT: Pre-training of Deep Bidirectional Transformers for Language Understanding", arXiv:1810.04805v2, May 24, 2019, pp. 1-16.

Yan Duan, et al., "RL2: Fast Reinforcement Learning via Slow Reinforcement Learning", arXiv:16911.027792v2, Nov. 10, 2016, pp. 1-14.

Norm Ferns, "Metrics for Finite Markov Decision Processes", American Association for Artificial Intelligence, 2004, Student Abstracts, pp. 950-951.

Kwang Gi Kim, "Deep Learning", Book Review Healthcare Informatics Research, Cppyright 2016 the Korean Society of Medical Informatics, pp. 1-4.

Abhishek Gupta, et al., "Learning Invariant Feature Spaces to Transfer Skills with Reinforcement Learning", arXiv:1703.02949v1, Mar. 8, 2017, pp. 1-14.

Sepp Hochreiter, et al., "Long Short-Term Memory", Neural computation 9, No. 8, 1997, pp. 1735-1780.

Leslie Pack Kaelbling, et al., Reinforcement Learning: A Survey, Journal of Artificial Intelligence Research 4, 1993, pp. 237-285.

Jens Kober, et al., "Reinforcement Learning in Robotics: A Survey", The International Journal of Robotics Research 32.11, 2013, pp. 1238-1274.

Vivay R. Konda, et al., "Actor-Critic Algorithms", Advances in neural information processing systems, 2000, pp. 1-7.

George Konidaris, et al., "Transfer in Reinforcement Learning via Shared Features", Journal of Machine Learning Research 13, 2012, pp. 1333-1371.

Alessandro Lazaric, "Transfer in Reinforcement Learning: a Framework and a Survey", In Reinforcement Learning, Springer, Berlin, Heidelberg, 2012, pp. 143-173.

Alessandro Lazaric, et al., "Transfer of Samples in Batch Reinforcement Learning", in Proceedings of the 25th International Conference on Machine Learning, 2008, pp. 1-8.

Timothy P. Lillicrap, et al., "Continuous Control with Deep Reinforcement Learning", arXiv:1509.02971v6, Jul. 5, 2019, pp. 1-14.

Chen Ma, et al., "Universal Successor Representations for Transfer Reinforcement Learning", arXiv:1804.03758v1, Apr. 11, 2018, pp. 1-4.

Tamas J. Madarasz, "Better transfer learning with inferred successor maps", arXiv:1906.07663v5, Jan. 10, 2020, pp. 1-23.

Neville Mehta, et al., "Transfer in variable-reward hierarchical reinforcement learning", Springer, Mach Learn 73, 2008, pp. 289-312.

Volodymyr Mnih, et al., "Asynchronous Methods for Deep Reinforcement Learning", in Proceedings of the 33rd International Conference on Machine Learning, JMLR: W7CP vol. 48, 2016, pp. 1-10.

Volodymyr Mnih, et al., "Play Atari with Deep Reinforcement Learning", arXiv:1312.5602v1, Dec. 19, 2013, pp. 1-9.

Marcin Andrychowicz, et al., "Learning dexterous in-hand manipulation", The International Journal of Robotics Research, vol. 39 (1), 2020, pp. 3-20.

Christopher Berner, et al., "Dota 2 with Large Scale Deep Reinforcement Learning", arXiv:1912.066801v1, Dec. 13, 2019, pp. 1-66.

Sinno Jailin Pan, et al., "A Survey on Transfer Learning", IEEE Transactions on knowledge and data engineering, 2009, pp. 1345-1359.

Emilio Parisotto, et al., "Actor-Mimic Deep Multtask and Transfer Reinforcement Learning", arXiv:1511.06342v4, Feb. 22, 2016, pp. 1-16.

Caitlin Phillips, "Knowledge Transfer in Markov Decision Processes", Technical report, Technical report, McGill University, School of Computer Science, 2006, pp. 1-17.

Janarthanan Rajendran, et al., "Attend, Adapt and Transfer: Attentive Deep Architecture for Adaptive Transfer from Multiple Sources in the Same Domain", arXiv:1510.02879v6, Sep. 21, 2020, pp. 1-18.

Ahmad El Sallab, et al., "Deep Reinforcement Learning framework for Autonomous Driving", IS&T International Symposium on Electronic Imaging 2017, Autonomous Vehicles and Machines 2017, https://doi.org.10.2352/ISSN.2470-1173.2017.19.AVM023, Society for Imaging Science and Technology, pp. 70-76.

Tom Schaul, et al., "Universal Value Function Approximators", in Proceedings of the 32nd International Conference on Machine Learning, JMLR: W&CP vol. 37, 2015, pp. 1-9.

Tom Schaul, et al., "Prioritzed Experience Replay", arXiv:1511.05952v4, Feb. 25, 2016, pp. 1-21.

Simon Schmitt, et al., "Kickstarting Deep Reinforcement Learning", arXiv:1803.03835v1, Mar. 10, 2018, pp. 1-9.

John Schulman, et al., "Trust Region Policy Optimization", in Proceedings of the 31st International Conference on Machine Learning, MLR: W& CP vol. 37, 2015, pp. 1-9.

John Schulman, et al., "High-Dimensional Continuous Control Using Generalized Advantages Estimation", arXiv:1506.02438v6, Oct. 20, 2018, pp. 1-14.

John Schulman, et al., "Proximal Policy Optimization Algorithms", arXiv:1707.06347v, Aug. 28, 2017, pp. 1-12.

David Silver, et al., "Mastering the game of Go with deep neural networks and tree search", Article in Nature, vol. 529, Jan. 28, 2016, pp. 484-503.

Ilya Sutskever, et al., Sequence to Sequence Learning with Neural Networks arXiv:1409.3215v3, Dec. 14, 2014, pp. 1-9.

Richard S. Sutton, "Leaning to Predict by the Methods of Temporal Differences", in Machine Learning 3, 1988, pp. 9-44.

Richard S. Sutton, et al., "Policy Gradient Methods for Reinforcement Learning with Function Approximation", NIPS'99, In Advances in neural information processing systems, pp. 1057-1063.

Erik Talvitie, et al., "An Experts Algorithm for Transfer Learning", IJCAI-07, 2007, pp. 1065-1070.

Matthew E. Taylor, et al., "Transferring Instances for Model-Based Reinforcement Learning", Springer, ECML PKDD 2008, Part II, LNAI 5212, 2008, pp. 488-505.

Matthew E. Taylor, et al., "Autonomous Transfer for Reinforcement Learning", in the Autonomous Agents and Multi-Agent Systems Conference (AAMAS-07), May 2008, pp. 1-8.

Matthew E. Taylor, et al., "Transfer Learning for Reinforcement Learning Domains: A Survey", in Journal of Machine Learning Research 10, 2009 pp. 1633-1685.

Zhilin Yang, et al., "XLNet: Generalized Autoregressive Pretraining for Language Understanding", arXiv:1906.08237v2, Jan. 2, 2020, pp. 1-18.

Haiyan Yin, et al., "Knowledge Transfer for Deep Reinforcement Learning with Hierarchical Experience Replay", in Proceedings of the Thirty-First AAAI Conference on Artificial Intelligence (AAAI-17), 2017, pp. 1640-1646.

Amy Zhang, et al., "Decoupling Dynamics and Reward for Transfer Learning", arXiv:1804.10689v2, Mary 9, 2018, pp. 1-12.

Itai Caspi, et al., "Reinforcement Learning Coach by Intel", Retrieved from https://www.intel.com/content/www/us/en/artificial-intelligence/posts/reinforcement-learning-coach-intel.html, Mar. 4, 2021, pp. 1-5.

* cited by examiner

SYSTEMS AND METHODS FOR KNOWLEDGE TRANSFER IN MACHINE LEARNING

BACKGROUND

Machine learning can solve challenging problems in many real-world applications, including robotics, autonomous vehicles, industrial control and operations, game playing, and so on. The advent of virtualization technologies for commodity hardware has provided benefits with respect to managing large-scale computing resources for many customers with diverse needs, allowing various computing resources to be efficiently and securely shared by multiple customers. For example, a provider network can provide various computing resources as a network-accessible service, and the customers can access and use the computing resources through network-connections to generate and train machine learning models. Generally, training a machine learning model, such as a reinforcement learning model, from scratch requires a huge amount of time and computing resources. Thus, it is desirable to have techniques to improve the learning speed of a machine learning model.

Figure 1:
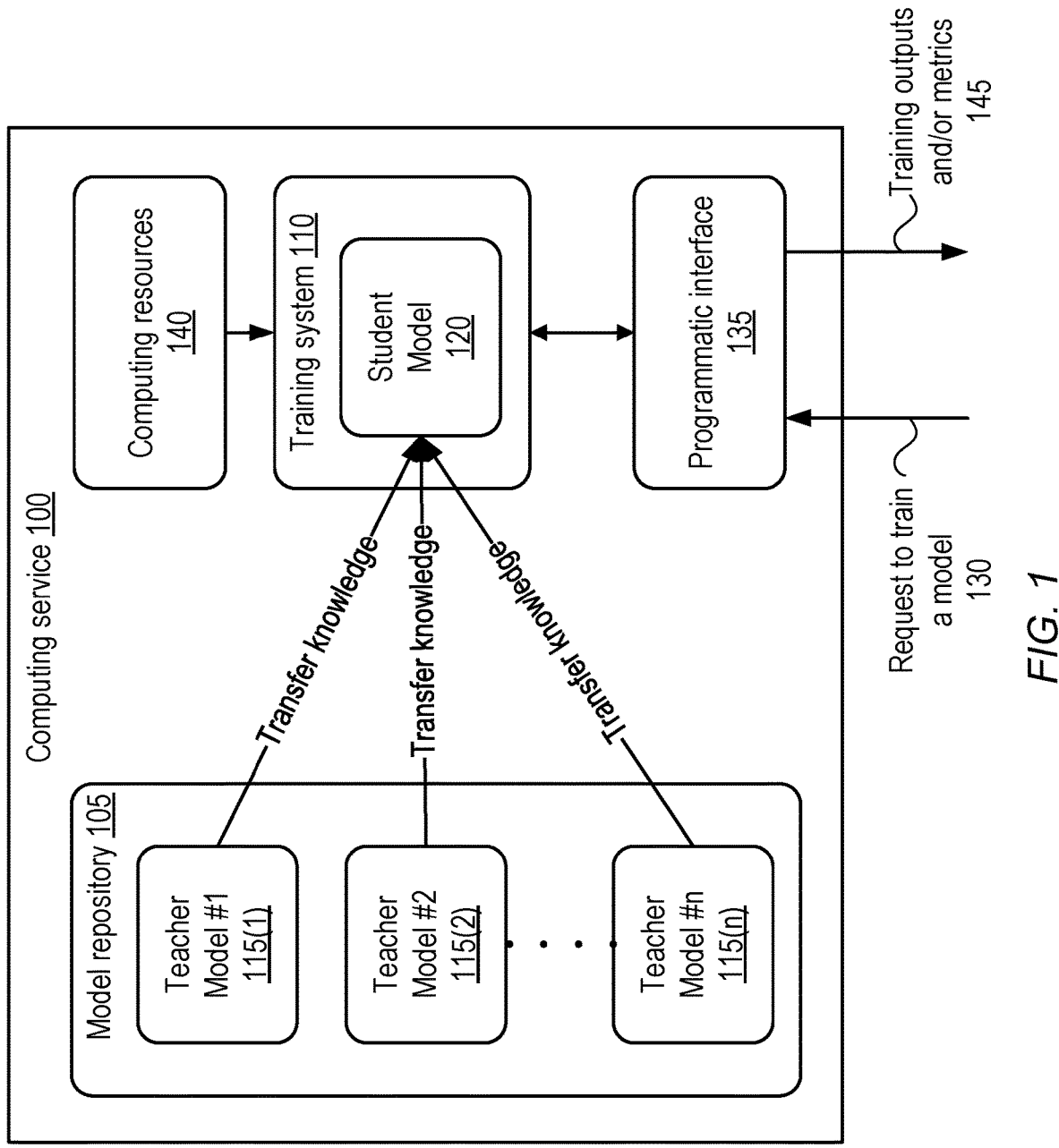
FIG. 1 is a block diagram showing an example training system as part of a network-accessible computing service, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques to train a machine learning model with knowledge transfer are described in this disclosure. For purposes of illustration, this disclosure will use reinforcement learning as an example to describe the techniques. One with ordinary skills in the art will appreciate that the techniques disclosed herein may apply to training of various machine learning models (e.g., convolutional neural network modes for image processing, recurrent neural network models for speech recognition, and so on) with knowledge transfer. Reinforcement learning is a machine learning technique that may attempt to learn a strategy (or a policy) that optimizes an objective for an actor (or an agent) acting in an environment. For example, the agent may be a robot, the environment may be a maze, and the goal may be for the robot to successfully navigate in the maze in the smallest amount of time. In other words, the action could be analogous to a control, whilst the policy tells the agent how to act from a particular state. In reinforcement learning, the agent may take an action at a current state, observe the next state of the environment, and get a reward based on the value of the state transition of the environment. This may form a sequence of states, actions and rewards (or a trajectory). The training of reinforcement learning is to find an optimal policy, or an optimal trajectory from an initial state to a target state, that maximizes the total rewards that the agent may receive as a result of its actions. Reinforcement learning is well-suited for solving problems where an agent is desired to make autonomous decisions, e.g., in applications such as robotics, autonomous vehicles, industrial control and operations, game playing, and so on.

In some embodiments, training a reinforcement learning model (also called "a student model") may include transferring knowledge from one or more other reinforcement learning models (also called "teacher model(s)"). For instance, the teacher models may have been previously trained to solve some decision-making task(s). When the decision-making task(s) of the teacher models share common feature(s) with the decision-making task(s) that the student model is going to solve, it may be possible to improve the learning of the student model by leveraging knowledge acquired by those trained teacher models. For instance, a teacher model that has been previously trained to play a Pac-Man game may transfer knowledge to a student model that is going to be trained to play a Space Invaders game, because the two games share similar tasks and playing strategies.

In some embodiments, the knowledge transfer may include transferring knowledge from the teacher models to a student model using a combination of representation transfer and instance transfer. In representation transfer, the student model may learn characteristics representing features of the teacher models which are commonly shared with the student model, and the knowledge transfer may perform an abstraction process to fit them into the policy or tasks of the student model. According to some embodiments, the representation transfer may be implemented based on a policy distillation, where representations of the policy or policies of the teacher models are abstracted and transferred to the policy of a student model. In instance transfer, samples of inputs and/or outputs of the teacher models (also called instances) may be used directly to train the student model. In the context of the reinforcement learning, for instance, the instances may include sampled trajectories of the teacher models. Because the instances are sampled following the policy or policies of the trained teacher models, they may have strong correlation to the desired policy of the student model. Thus, re-using the instances from the teacher models may improve the learning speed of the student model. Moreover, in some embodiments, the instance transfer may use a filter to selectively identify instances that satisfy filter criteria for transferring knowledge from the teacher models to the student model.

In some embodiments, the representation transfer and the instance transfer may be performed alternatingly, e.g., according to a duty cycle D. For instance, at duty cycle D=50%, in one epoch of training, the knowledge transfer may be implemented with the representation transfer, and in a next epoch, it may be performed with the instance transfer. In another example, when the duty cycle D=33%, the representation transfer may be performed twice as many as the instance transfer. Note that the knowledge transfer techniques disclosed herein may apply to transferring ether a single policy from one teacher model to a student model or multiple policies from multiple teacher models to the student model.

One skilled in the art will appreciate that the techniques disclosed herein are capable of providing technical advantages, including: (1) increasing training speed of a machine learning model by "jumpstart," (2) improving the performance of the machine learning model by leveraging valuable, acquired knowledge from trained model(s), (3) improving convergence opportunities of the machine learning model to an optimal solution by leveraging knowledge from previously trained models, and (4) reducing consumption of computing resources by shortening the training process.

FIG. 1 shows an example training system as part of a network-accessible computing service, according to some embodiments. In this example, computing service 100 may be offered by a provider network as a network-accessible service to clients, along with various other network-accessible services such as remote storage services, remote database services, remote network services, remote e-mail services, remote content streaming services, and the like.

Computing service 100 may provide one or more computing resources, e.g., memory, CPUs, GPUs, servers, nodes, etc. for various remote computing tasks. In some embodiments, computing service 100 may include model repository 105, which may store various machine learning models that have been previously trained to perform various corresponding tasks. For instance, teacher models 115 may include reinforcement learning models, convolutional neural network models, recurrent neural network models, support vector machine models, and so on. In some embodiments, computing service 100 may include training system 110 which may be used to train various machine learning models. In some embodiments, computing service 100 may receive training request 130 from a client, e.g., through a network connection, to create and train student model 120. In some embodiments, the client may refer to various computing devices (e.g., a laptop computer, a desktop computer, a tablet, a wearable device, etc.) that a customer or subscriber of computer service 100 may use to access for creating and training a machine learning model. In some embodiments, the network connection may correspond to a wired connection, a wireless connection, or a combination of both between the client and computing service 100. In some embodiments, training request 130 may be received by computing service 100 at programmatic interface 135. Programming interface 135 may include a control panel, a command line interface, a graphic user interface, an endpoint, an application program interface, etc. that the client and computing service 100 may use to communicate with each other.

In some embodiments, training request 130 may specify a training model or algorithm (e.g., a reinforcement learning model), and/or create and run a training job. Responsive to training request 130, training system 110 may identify one or more teacher models 115 based at least in part on a characteristic representing similarities of teacher models 115 with respect to student model 120. For instance, teacher models 115 may be identified based on similarities of the tasks that teacher models 115 have been previously trained to solve with respect to the task that teacher model 120 is trained to perform. Note that in some embodiments, training system 110 may not necessarily identify teacher models 115 based on similarities, at least explicitly, with respect to student model 120. For instance, in some embodiments, training system 110 may identify and use model 115 as the teacher model, which may have been training for a task different from that of student model 120. As described above, teacher models 115 that have previously been trained to play a Pac-Man game may be selected for knowledge transfer to student model 120 that will be trained to play a Space Invaders game. In another example, teacher models 115 may be selected based on their associated machine learning algorithms. For instance, teacher models 115 based on reinforcement learning algorithms may be identified to transfer knowledge to student model 120 that is also a reinforcement learning model. Depending on the number of teacher models 115 being identified, training system 110 may transfer either a single policy (from one single teacher model 115) or multiple policies (from multiple teacher models 115) to student model 120. In addition, in some embodiments, the client may download data associated with teacher models 115 and/or student model 120 to his/her local computing devices to perform the training locally. In some embodiments, the client may access and utilize computing resources offered by computing service 100 to implement the training of student model 120 remotely. In the latter case, computing service 120 may automatically manage, e.g., in a serverless fashion, required computing resources 120 for the client, according to some embodiments. For instance, computing service 120 may automatically identify, reserve, configure and launch computing resources 140 according to the computing needs for training of student model 120.

In some embodiments, the knowledge transfer from teacher models 115 to student model 120 may include a combination of representation transfer and instance transfer. As described above, knowledge transfer may be based on certain types of similarity between teacher models 115 and student model 120. In some embodiments, the representation transfer may transfer representations of common features shared between teacher models 115 and student model 120. Taking the reinforcement learning as one example, representation transfer may transfer representations of the policy or policies of teacher models 115 to student model 120, according to some embodiments. In some embodiments, the representations may be abstracted by calculating a loss representing a difference between the policy or policies of teacher models 115 and the policy of student model 120, and the loss may then be used in the update of the policy of student model 120.

Compared to representation transfer, instance transfer may seem more straightforward. In some embodiments, instance transfer may transfer instances—samplings of the inputs and/or outputs of a teacher model—and then re-use the instances (or samples) to train a student model. Again, in the exemplary context of reinforcement learning, training system 110 may obtain one or more trajectories (e.g., sequences of states, actions and rewards) of teacher models 115, and use the trajectory samples as instances to facilitate the training of student model 120. For instance, training system 110 may sample one or more trajectories following the policy of policies of teacher models 115, which may form the instances. Moreover, in some embodiments, training system 110 may include a filtering mechanism in the instance transfer to selectively transfer identified instances from teacher models 115 to student model 120. For instance, training system 110 may calculate advantage estimates for respective sampled trajectories. Training system 110 may compare the respective advantage estimates with a filter criterion (e.g., a scalar value), where trajectory samples producing an advantage estimate beyond the filter scalar may be selected for knowledge transfer whilst the other trajectory samples may be removed. This may ensure the knowledge transfer from only successful samples. In some embodiments, the filter criterion may be a constant value, or a variable value adjustable by the client or training system 110.

In some embodiments, the representation transfer and instance transfer may be performed by training system 110 alternatingly, e.g., according to a duty cycle D. For instance, at duty cycle D=50%, training system 110 may perform the representation transfer and instance transfer, one after another, from teacher models 115 to student model 120. At duty cycle D=33%, training system 110 may perform the representation transfer twice as many as the instance transfer. Moreover, in some embodiments, the knowledge transfer may start with the representation transfer, whilst in some embodiments, the knowledge transfer may begin with the instance transfer. In addition, accordingly to some embodiments, training system 110 may not necessarily perform the representation transfer and instance transfer in the alternating fashion. Instead, training system 110 may complete one portion or entire representation transfer (or, alternatively, instance transfer) first, and then switch to carry out the instance transfer (or, alternatively, representation transfer), according to some embodiments. Alternatively, in some embodiments, the representation transfer and instance transfer may be performed in an integral (non-alternating) mode, where the student policy may be updated according to gradient ascents (e.g., to increase the rewards) calculated based on the representation and instance transfers altogether.

Amid and/or at the end of the training, training system 110 may provide various training outputs and/or metrics 145 to the client. Training output and/or metrics 145 may include customer-specified and/or system-default outputs and/or metrics associated with the training of student model 120. For instance, training outputs and/or metrics 145 may include time series of reward values, loss values, policy gradient values, and the like. In some embodiments, training system 110 may provide training outputs and/or metrics 145 in the form of visual displays, e.g., a plot of reward values versus time.

Figure 2:
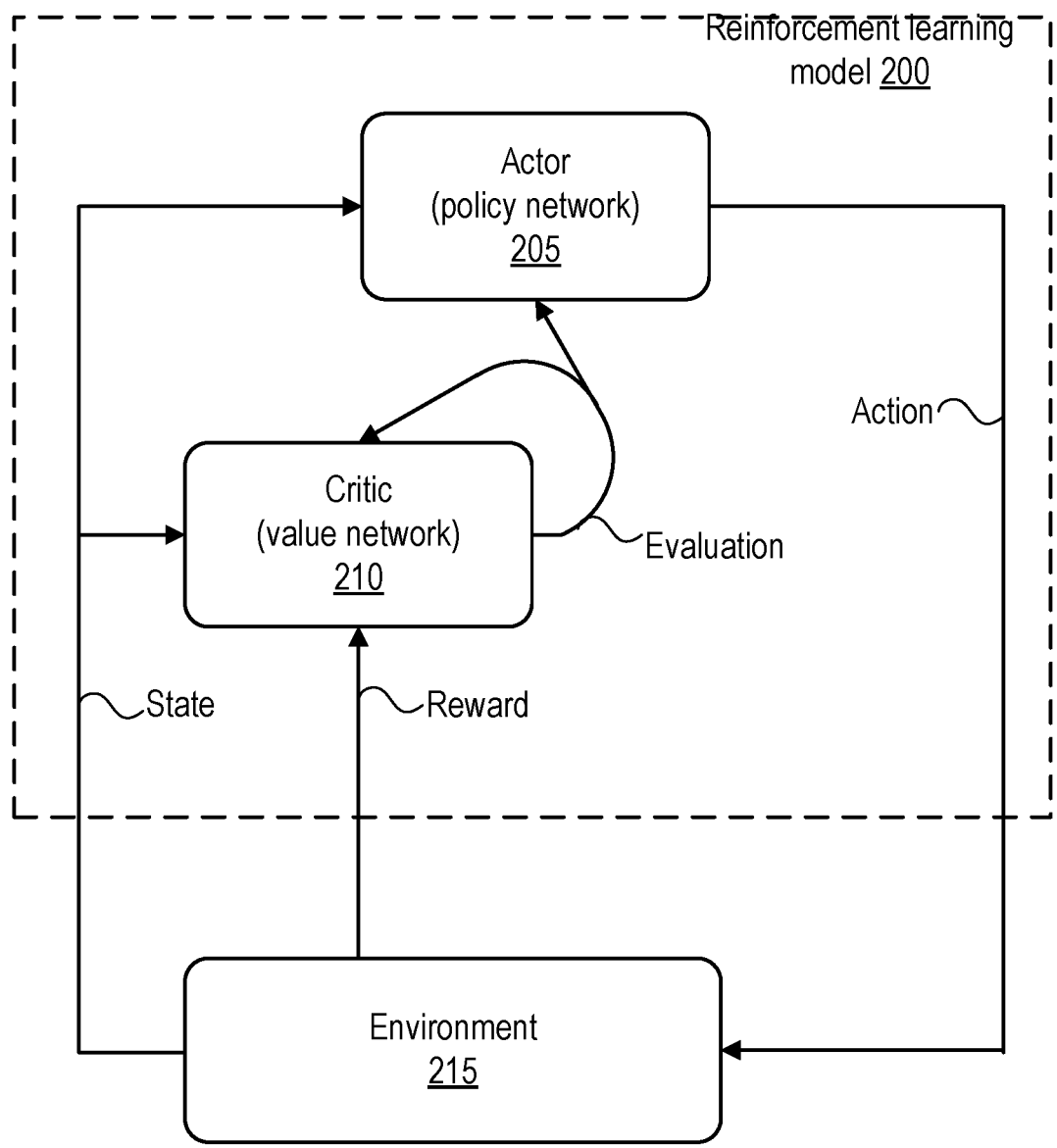
FIG. 2 is a block diagram showing an example reinforcement learning model, according to some embodiments.

A reinforcement learning model may include model-based learning or model-free learning. In model-based learning, the agent will interact with the environment and from the history of its interactions, the agent will try to approximate the environment state transition and reward models. Afterwards, given the models it learnt, the agent can use value-iteration or policy-iteration to find an optimal policy. By comparison, the model-free learning may bypass the modeling step altogether in favor of learning a policy directly. FIG. 2 shows an example model-free reinforcement learning model, according to some embodiments. In this example, reinforcement learning model 200 may include actor (or agent) 205 and critic 210, which may interact with environment 215. Actor 205 may take an action a at a state s following a policy. In response, environment 215 may determine a next state s' and provide a reward r for actor 205's taking of action a at the state s. Environment 215 may send the next state s' to actor 205, and reward r and next state s' to critic 210. Critic 210 may evaluate how good actor 205's decision is to take the action a at state s. Because reinforcement learning model 200 transitions to state s' due to actor 205's decision to take action a at state s, the evaluation by critic 210 may thus be based on evaluating how good state s' is to allow actor 205 to achieve the optimal trajectory. The evaluation may be used by actor 205 and critic 210 to update the policy and evaluation model, respectively. This process may continue until the end of the training, e.g., at expiration of a time or convergence of a training metric.

In some embodiments, environment 215 may be modeled by a tuple M=(S, A, p, r, γ), where S and A respectively refer to sets of continuous or discrete states s and actions a, p refers to a probability function p(s'|s, a) that denotes the probability for transitioning to state s' upon taking action a at state s, r refers to a reward function that determines a reward received by actor 205 for transition from s to s' with a, and γ is a discount factor (0<γ<1). As described above, the goal of reinforcement learning model 200 is to learn a policy π that maps a state to a probability distribution over actions at each time step t (e.g., a probability function to take available actions $a_{t(1)}, a_{t(2)}, \ldots$ at a state $s_t$), so that the policy π maximizes the total (accumulated) expected rewards, e.g., $\Sigma_{t \geq 0} \gamma^t r(s_t, a_t, s_{t+1})$. In other words, training of actor 205 is to find the policy π that maximizes the probability for actor 205 to take an optimal action at each time step t so that the resultant trajectory may return the maximum total expected return.

As described above, the evaluation of critic 210 may be based on evaluating how good a state is to allow actor 205 to achieve the optimal trajectory, according to some embodiments. In some embodiments, this evaluation may be implemented base at least in part a state value function. The state value function at time step t may be determined according to equation (1), according to some embodiments.

$$V^\pi(s) = E[\Sigma_{i \geq t} \gamma^{i-t} r(s_i, a_i, s_{i+1}) | s_t = s]  \quad (1)$$

where E(·) function calculates an expected value, given that the interactions between actor 205 and environment 215 may be stochastic processes, and the use of symbol "|" with $s_t=s$ means "given a condition $s_t=s$." As shown in equation (1), the state value function at state $s_t$ may represent the total expected rewards at state $s_t$ following a specific policy π. In some embodiments, the state value function at state $s_t$ may be calculated with a random probability. For instance, after actor 205 arrives at state $s_t$ following a specific policy π, actor 205 may have three actions $at_{(1)}$, $at_{(2)}$ and $at_{(3)}$ available to choose at state $s_t$. With the random probability, actor 205 may treat three actions equally (e.g., 33% probability to take each action) without preference to any specific action.

In some embodiments, an action value function (also called Q function) may be calculated to represent the total expected rewards at state with taking a specific action. In some embodiments, the action value function (or Q function) at time step t may be determined according to equation (2).

$$Q^\pi(s,a) = E[\Sigma_{i \geq t} \gamma^{i-t} r(s_i, a_i, s_{i+1}) | s_t = s, a_t = a]  \quad (2)$$

As shown in equation (2), the action value function (or Q function) at state $s_t$ with action $a_t$ may represent the total expected rewards at state $s_t$ when actor 205 indeed takes action $a_t$, e.g., following the policy π (rather than with a random probability). In some embodiments, the valuation of critic 210 may be based on advantages. In some embodiments, the advantages may be determined according to equation (3).

$$A^\pi(s,a) = Q^\pi(s,a) - V^\pi(s)  \quad (3)$$

In view of the above state value function in equation (1) and action value function in equation (2), the advantage in equation (3) may thus represent an extra reward that actor 205 could obtain by actually taking the particular action at $a_t$ state $s_t$. Thus, this extra reward or advantage may be used by critic 210 as a metric to evaluate the actions of actor 205. For instance, when actor 205 takes action $a_t$ at state $s_t$ that ends up with a large extra reward or advantage $A(s_t, a_t)$, critic 210 may give a positive evaluation for this decision of actor 205 at state $s_t$. Conversely, when actor 205 takes action at $a_t$ state $s_t$ that produces a small extra reward or advantage $A(s_t, a_t)$, critic 210 may give a less positive or even a negative evaluation for this decision of actor 205 at state $s_t$. In some embodiments, the advantages may be approximated by a generalized advantage estimates (GAE), which is an extension of the temporal difference error (TD error). In some embodiments, the TD error may be determined according to equation (4).

$$\delta_t = r_{t+1} + \gamma V^\pi(s_{t+1}) - V^\pi(s_t)  \quad (4)$$

In some embodiments, the GAE may be determined as a weighted average of the k-step discounted advantage estimates, according to equation (5).

$$\hat{A}_t = \sum_{l=0}^{\infty} (\gamma \sigma)^l \delta_{t+l}  \quad (5)$$

where parameter σ is 0≤σ≤1 and may allow a trade-off of the bias and variance. For instance, when σ=0, the training of reinforcement learning model 200 may reduce to an unbiased TD learning, while as σ increases, it may reduce the variance of the estimator but increase the bias.

In some embodiments, the state value function in equation (1) and/or the action value function (or Q function) in equation (2) may be constructed in tabular forms. For instance, when actor 205 navigates different paths, the resultant trajectories—the sequences of states, actions and rewards—may be stored in respective lookup tables, and the state value and/or Q value may be determined according to the lookup tables at each time step t. However, for complex learning, it may become challenging, if not impossible, to create tables to memorize all the information. Thus, in some embodiments, the state value function used by critic 210 and/or policy used by actor 205 may respectively be approximated, e.g., to be predicted by a neural network, instead of calculated with equations (1)-(3). For instance, the state value function V and/or the policy π may respectively be replaced by a neural network (also called a value network $V_\upsilon$ and/or a policy network $\pi_\theta$) with respective sets of parameters υ and θ. Thus, by training their respective parameters υ and θ, the value network and/or policy network may be used to approximate (e.g., predict) the respective value function V and the policy π.

As described above, the policy π may represent a mapping from state s to action a with a probability distribution (e.g., π(a|s)), and different policies may result in different total expected rewards Q. When the policy is approximated by a policy network (e.g., a neural network) in terms of parameters θ (e.g., $\pi_\theta(a|s)$), the total expected rewards Q actually also become a function of parameters θ. Thus, the search of the optimal policy may be implemented by tuning the parameters θ of the policy network. One with ordinary skills will appreciate that any policy gradient methods may be used to update the policy network. In some embodiments, training of actor 205 may be performed based at least in part on a policy loss. In some embodiments, the policy loss may be calculated according to a clipped proximal policy optimization (Clipped PPO) loss, as shown in equation (6).

$$L_{clip}(\theta) = E[\min(r_t(\theta) \cdot \hat{A}_t, \text{clip}(r_t(\theta), 1-\varepsilon, 1+\varepsilon) \cdot \hat{A}_t)]  \quad (6)$$

where $r_t(\theta)$ refers to the ratio of $\pi_\theta(a|s)/\pi_{\theta old}(a|s)$, $\pi_\theta(a|s)$ and $\theta_{\theta old}(a|s)$ respectively refer to the post-updated (or new) policy and pre-updated (old) policy of actor 205, ε is a parameter 0≤ε·1, and the clip(·) function truncates $r_t(\theta)$ to the range of (1−ε, 1+ε). Training of actor 205 may be performed to update parameters θ based on the gradient ascent of the policy loss (e.g., $L_{clip}$) with respect to parameters θ (e.g., to increase the rewards). Reducing the policy loss (e.g., $L_{clip}$) may result in an increase in the total expected rewards following the policy. In some embodiments, besides the clipped PPO, the policy may also be determined based on other suitable algorithms. For instance, the policy loss may be calculated according to a classical advantage-actor-critic (A2C) gradient policy algorithm as shown in equation (7), $$L_{A2c}(\theta) = E[\log \pi(a|s) \cdot \hat{A}_t]  \quad (7)$$

or a trust region policy optimization (TRPO) algorithm for a coefficient β of the maximum Kullback-Leibler (KL) divergence computed over states, as shown in equation (8).

$$L_{clip}(\theta) = E\left[\frac{\pi_\theta(a|s)}{\pi_{\theta old}(a|s)} \cdot \hat{A}_t - \beta KL[\pi_{\theta old}(\cdot|s), \pi_\theta(\cdot|s)]\right]  \quad (8)$$

where KL(·) indicates the KL divergence between the distributions corresponding to the two mean parameter vectors in the parenthesis.

As described above, the representation transfer may transfer representations of common features from a teacher model (not shown in FIG. 2) to a student model (e.g., reinforcement model 200). In some embodiments, the representation transfer may transfer representations of the policy of the teacher model to the student model. In some embodiments, a loss may be determined to represent a difference between the policies of the teacher and student models. The loss may then be used to update the policy of the student model. In some embodiments, the loss may be determined according to equation (8).

$$L_{distill}(\theta) = H[\pi_{teacher}(a|s) = \|\lambda_\theta(a|s)]  \quad (9)$$

where H(·∥·) refers to a cross-entropy. Incorporating $L_{distill}$ in equation (9) into the Clipped PPO loss $L_{clip}$ in equation (6), a "new" policy loss $L_{RL}$ may be determined as shown in equation (10), according to some embodiments. Because the new policy loss $L_{RL}$ includes both $L_{distill}$ and $L_{clip}$, reducing $L_{RL}$ may cause the policy of the student model to mimic the policy of the teacher model (e.g., by reducing $L_{distill}$) as well as increase the total expected rewards (e.g., by reducing $L_{clip}$) following the updated student model.

$$L_{RL}(\theta) = L_{clip}(\theta) - \beta L_{distill}(\theta) \quad (10)$$

where β is a parameter 0≤β≤1. Note that it is a minus between the two losses because the training is to increase the rewards (e.g., with the gradient ascent of $L_{clip}$) but reduce the difference between the teacher and student policies (e.g., with the gradient descent of $L_{distill}$). Because $L_{RL}$ includes the loss representing the difference between the policies of the teach and student models, when the policy of the student model is updated based on $L_{RL}$ (e.g., based on the gradient ascent of $L_{RL}$ with respect to parameters θ), representation of the knowledge (e.g., the policy) of the teacher model is transferred to the student model. In view of equation (10), parameter β may represent an amount of knowledge transferred from the teacher model to the student model. Parameter β may be a constant or a variable adjustable midst the training of the student model. For instance, parameter β may be selected as a large value at the beginning of the training to expedite the representation transfer from the teacher model. As the training progress, parameter β may gradually reduce to zero to allow the student model to learn on its own without external knowledge transfer any more.

Compared to representation transfer, the instance transfer may seem more straightforward. The instance transfer may involve training the student model directly with instances, e.g., samplings of the inputs and/or outputs of a teacher model. For instance, the instances may include sampled trajectories (e.g., sequences of states, actions and rewards) following the policy of the teacher model. The student model may use the trajectories (which are sampled with the policy of the teacher model), as training data, to calculate a policy loss (e.g., the Clipped PPO loss $L_{clip}$ according to equation (6)) and use the policy loss to update the policy network $\pi_\theta(a|s)$ of the student model (e.g., e.g., based on the gradient ascent of $L_{clip}$ with respect to parameters θ). Because the policy loss is determined based at least in part on samples obtained following the policy of the teacher model, knowledge from the teacher model may be "implicitly" transferred to the student model along with the update of the student model using the calculated policy loss. As described above, in some embodiments, the instance transfer may use a filter to selectively identify instances that satisfy filter criteria for transferring knowledge from the teacher models to the student model.

In some embodiments, the training of reinforcement learning model 200 may include a prioritized experience replay. The prioritized experience replay may allow reinforcement learning model 200 to be repeatedly trained with certain (prioritized) training data. For instance, reinforcement learning model 200 may maintain a buffer of policy parameters and/or corresponding trajectory output ("experience"), with which reinforcement learning model 200 has previously been trained. In some embodiments, the experience may be prioritized. For instance, only experience with a policy loss (e.g., $L_{RL}$ or $L_{clip}$) beyond a certain level may be stored in the buffer. The prioritized experience in the buffer may be re-used to train reinforcement learning model 200. The repeated training with the prioritized experience may strengthen the memory of reinforcement learning model 200 as to what policy shall be avoided or taken.

For purposes of illustration, the descriptions above with regards to FIG. 2 focus on knowledge transfer from one single teacher model to a student model. In some embodiments, reinforcement learning model 200 may perform knowledge transfer of multiple policies. The operations may be substantially similar to what is described above, except that the calculation of the policy loss (and associated operations) may be adapted for multi-policy transfer. For instance, in the representation transfer, the policy loss $L_{RL}$ in equation (10) may further include additional $L_{distill}$ determined for corresponding additional teacher policies. Similarly, in the instance transfer, the policy loss $L_{clip}$ in equation (6) may further include additional advantage estimates Â determined based on samples that are obtained following additional teacher policies.

In addition, as described above, reinforcement learning 200 may include a value network to approximate the value function. Thus, training of reinforcement learning 200 may further include the update of the value network $V_\upsilon$ (e.g., by updating the corresponding parameters υ). In some embodiments, reinforcement learning 200 may train the value network $V_\upsilon$ in a supervised mode, e.g., based on a least square approach. For instance, reinforcement learning 200 may sample trajectories following a specific student policy, add up the sampled rewards in respective trajectories, use the sampled reward sum as the "true values" of the expected rewards for the associated states and/or state-action pairs in the corresponding trajectories (e.g., the sum of the sampled rewards in a trajectory is considered as the expected rewards for the corresponding states and/or state-action pairs in the trajectory), and train the value network $V_\upsilon$ to update the parameter v to fit the "true values" based on least square errors between the predicted rewards from the value network and the "true values" determined from the sample trajectories.

In view of the above descriptions, an example training process of a student model with a combination of representation transfer and instance transfer may be illustrated by the example pseudocode below. In this example, the representation transfer and instance transfer are alternated according to a duty cycle D=50%.

```
for k = 1, 2, . . . do
    // Code for policy network update with representation transfer, and value network update
    if k is odd then
        Obtain a number of m trajectories J₁ ... ₘ = {(s, a, s', r)} following π_θold of the student model
        Fit the value network V_v of the student model using J₁ ... ₘ to update parameters v of the value
            network
        Determine advantage estimates Â₁ ... ₘ according to equations (4)-(5)
        Determine a policy loss L_clip according to equation (6)
        Determine a loss L_distill according to equation (9)
        Determine a new loss Lrl according to equation (10)
        Perform gradient ascent on L_RL with respect to parameters θ to update the policy network π_θold
            of the student model using J
    // Code for policy network update with instance transfer
    else
        Obtain a number of n trajectories J'₁ ... ₙ = {(s, a, s', r)} following π of the teacher model
        Determine advantage estimates Â₁ ... ₙ according to equations (4)-(5)
        for I = 1, . . . , n, do
            if Â_i < ζ then // ζ is a filter criterion
                Remove Â_i and the corresponding trajectory J'_i
            end if
        end for
        Determine a policy loss L_clip according to equation (6)
        Perform gradient ascent on L_clip with respect to parameters θ to update the policy network
            π_θold of the student model using J'
    end if
end for
```

In another example, the representation transfer and instance transfer may be performed in an integral (non-alternating) mode, as shown by the following pseudocode, where parameters of the student policy may be updated according to gradient ascents calculated based on the representation and instance transfers altogether.

```
for k = 1, 2, . . . do
    // Code for collecting samples following the student policy and the student policy, respectively
    Obtain a first set of trajectories (or samples) J₁ ... ₘ = {(s, a, s')} following π_θold of the student model
    Obtain a second set of trajectories (or samples) J'₁ ... ₙ = {(s, a, s')} following π_teacher of the teacher model
    // Code for update the value network of the student model
    Fit the value network Vu of the student model using only J to update parameters u of the value network
    // Code for determining the loss representing a difference between the student and teacher model as
        part of representation transfer
    Determine the first and second sets of advantage estimates Â₁ ... ₘ for J and Â₁ ... ₙ for J' according to
        equations (4)-(5)
    Determine advantage estimates Â₁ ... ₘ according to equations (4)-(5)
    Determine a policy loss L_clip using J according to equation (6)
    Determine a loss L_distill using J according to equation (9)
    Determine a new loss L_RL using J according to equation (10)
    // Code to filter samples as part of instance transfer
    for / = 1, . . . , n do
        if Â_i < ζ then // ζ is a filter criterion
            Remove Â_i and the corresponding trajectory J'_i
        end if
    end for
    // Code for determining the advantage estimates as part of instance transfer
    Determine a policy loss L_clip using filtered J' according to equation (6)
    // Code to update the student policy with the representation transfer and instance transfer altogether,
        where a1 and a2 respectively refer to the learning rates for representation transfer and
        instance transfer
    Update parameters θ of π_θold the student model according to gradient ascents based on the above
        calculated L_RL using J and L_clip using J': θ ← θ + a₁∇_θL_RL + a₂∇_θL_clip
end for
```

Figure 3:
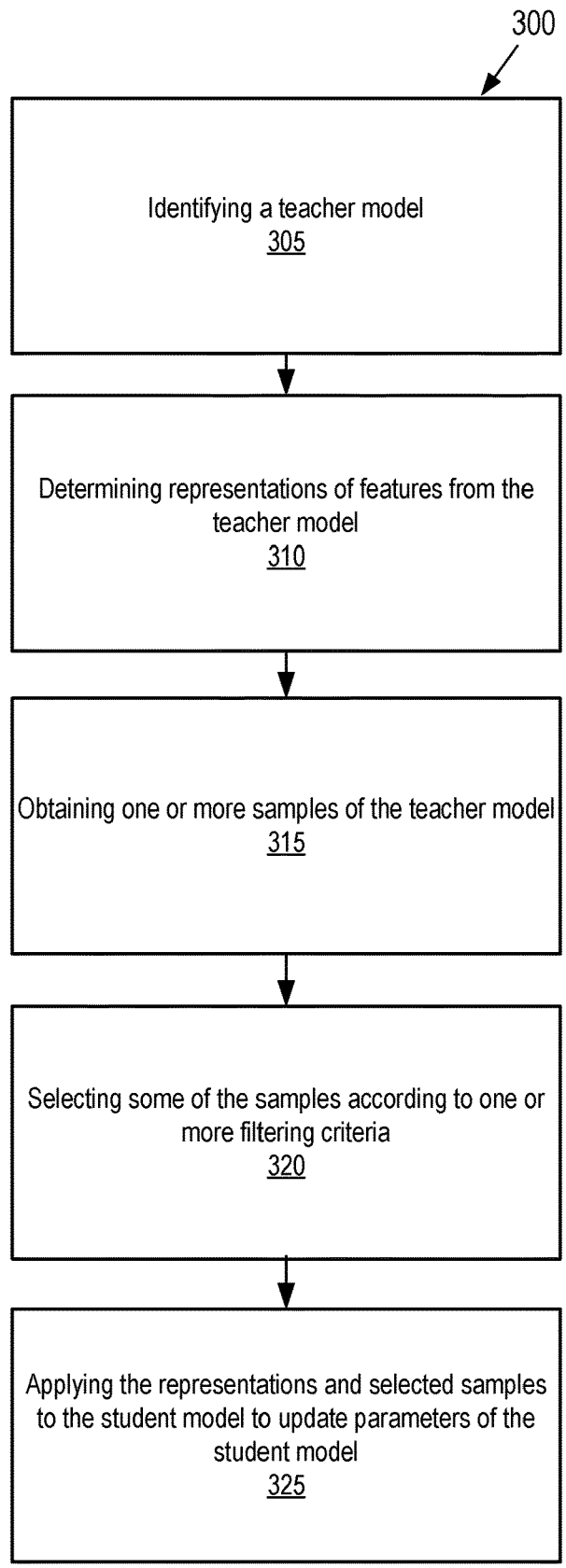
FIG. 3 is a flowchart showing an example process to train a student model with knowledge transfer, according to some embodiments.

FIG. 3 shows an example process to train a student model with knowledge transfer, according to some embodiments. In this example, process 300 may commence with identifying a teacher model, according to some embodiments (block 305). As described above, in some embodiments, the teacher model may be identified based on a similarity with respect to the student model, and knowledge transfer may be performed based on the similarity between two models. As described above, identification of the teacher model based on a similarity with respect to the student model may be optional but not mandatory part of the techniques disclosed herein. For instance, in some embodiments, a model, which may have been trained for a task different from the task of the student model, may also be selected and used as the teacher model for knowledge transfer. In some embodiments, the teacher model may be identified based on performing a similar task as the student model. In some embodiments, the teacher model may be selected based on interacting with a similar environment as the student model. In some embodiments, the teacher model may be determined based on sharing a similar type of machine learning as the student model. Upon identification of the teacher model, representations of features from the teacher model may be determined (block 310). For instance, the representations of a policy of the teacher model may be abstracted. As described above, in the representation transfer, a loss representing a difference between the policies of the teacher and student models may be determined (e.g., according to equation (9)) to assist the learning of the student model. In some embodiments, process 300 may include obtaining samples of the teacher model (block 315). For instance, as described above, in the instance transfer, the samples may be collected by sampling the trajectories following the policy of the teacher model. In some embodiments, process 300 may include a filtering mechanism as part of the instance transfer to select some of the samples according to one or more filtering criteria (block 320). As described above, the individual samples may be compared to a threshold and only those with values larger than the threshold may be selected for implementing the instance transfer. In some embodiments, process 300 may include applying both the representation and samples to the student model to update parameters of the student model (block 325). For instance, as described above, a policy loss may be calculated based at least in part on the loss representing the difference between the policies of the teacher and student models in the representation transfer (e.g., $L_{RL}$ according to equation (10)) in representation transfer, or based at least in part on the advantage estimates calculated with the samples following the policy of the teacher model (e.g., $L_{clip}$ according to equations (6)) in instance transfer. The parameters θ of the policy network of the student model may be updated according to the policy loss (e.g., based on a gradient ascent of Liu, or $L_{clip}$ with respect to parameters θ), as described above.

Figure 4:
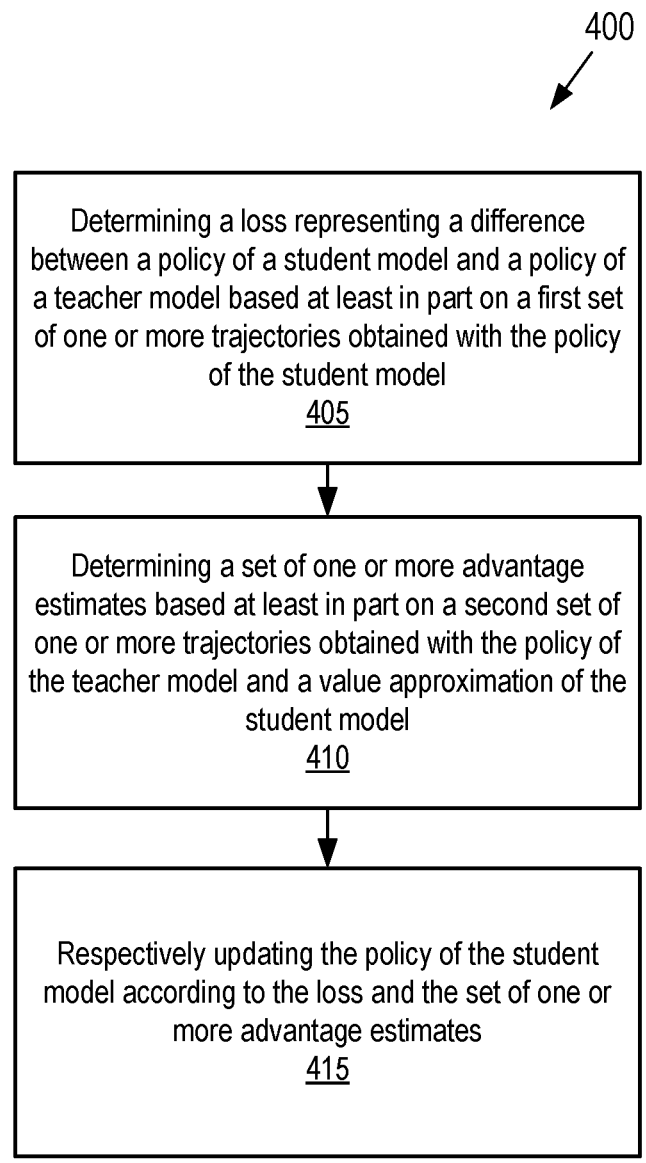
FIG. 4 is a flowchart showing another example process to train a student model with knowledge transfer, according to some embodiments.

FIG. 4 shows another example process to train a student model with knowledge transfer, according to some embodiments. In this example, process 400 may commence with determining a loss representing a difference between a policy of a student model and a policy of a teacher model based at least in part on a first set of one or more trajectories obtained with the policy of the student model, according to some embodiments (block 405). As described above, the loss (e.g., $L_{distill}$) representing a cross-entropy of the policies of the student and teacher models may be determined according to equation (9). In some embodiments, this loss may be used to perform a representation transfer. In some embodiments, process 400 may include determining a set of one or more advantage estimates based at least in part on a second set of one or more trajectories obtained with the policy of the teacher model and a value approximation of the student model (block 410). As described above, advantage estimates Â may be determined based at least in part on trajectories obtained following the policy of the teacher model (e.g., according to equation (5)) and a value approximation of the student model (e.g., according to equation (4)). In some embodiments, the advantage estimates may be used to perform an instance transfer. In some embodiments, process 400 may include updating the policy of the student model based at least in part on the loss and the set of one or more advantage estimates (block 415). For instance, as described above, a policy loss may be calculated based at least in part on the loss representing the difference between the policies of the teacher and student models in the representation transfer (e.g., $L_{RL}$ according to equation (10)) in the representation transfer, or based at least in part on the advantage estimates calculated with the samples following the policy of the teacher model (e.g., $L_{clip}$ according to equations (6)) in the instance transfer. The parameters θ of the policy network of the student model may be updated according to the calculated policy loss (e.g., based on a gradient ascent of $L_{RL}$ or $L_{clip}$ with respect to parameters θ), as described above.

Figure 5:
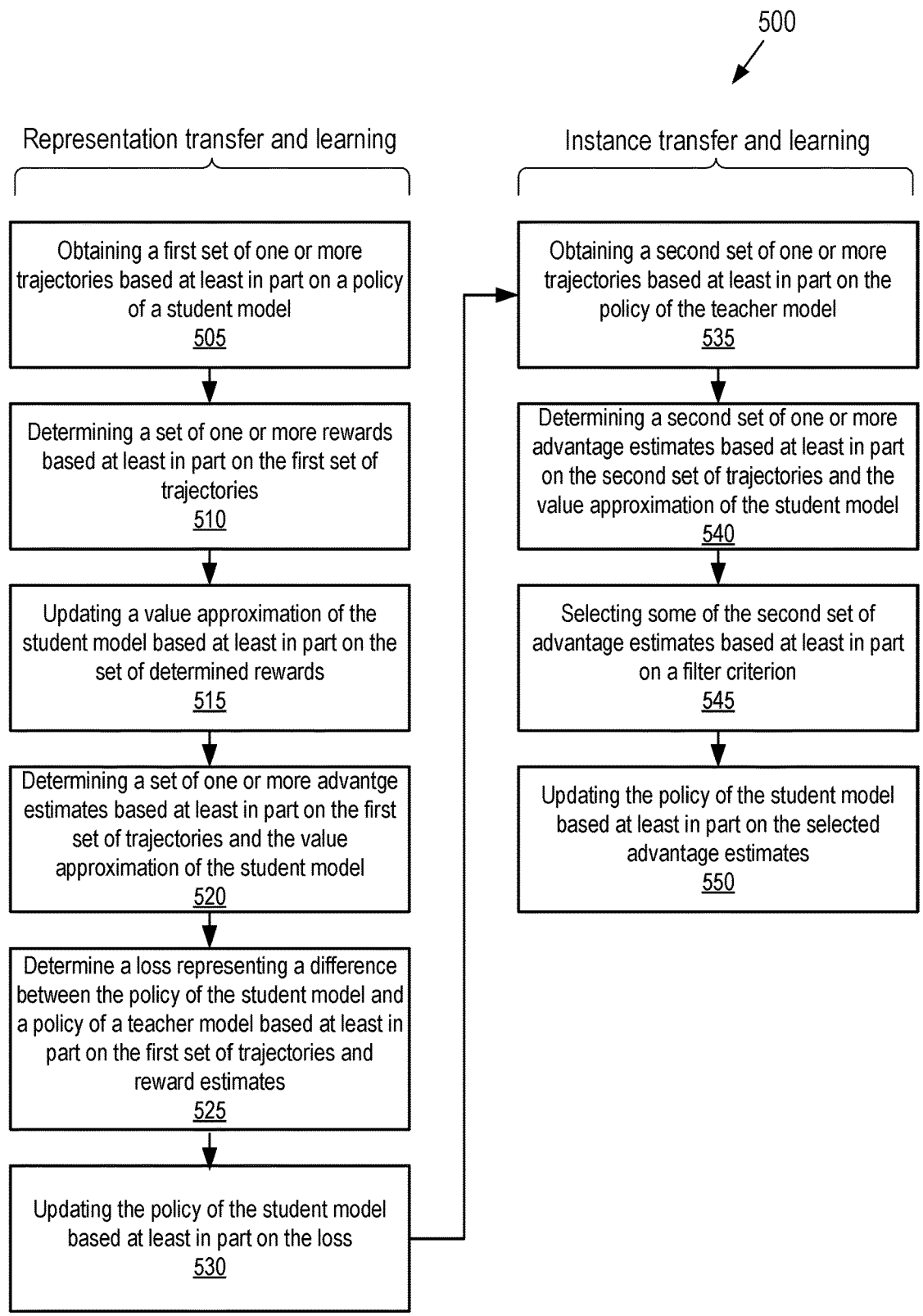
FIG. 5 is a flowchart showing another example process to train a student model with knowledge transfer, according to some embodiments.

FIG. 5 shows another example process to train a student model with knowledge transfer, according to some embodiments. FIG. 5 may be viewed with reference to the above example pseudocode to facilitate understanding of the example process shown in FIG. 5. In this example, process 500 may commence with obtaining a first set of one or more trajectories based at least in part on a policy of a student model (block 505). As described above, the goal of a reinforcement learning is to navigate the state-action space to search for the optimal policy or optimal trajectory from the initial state to the target state. One approach may be to perform sweeps through the entire state-action space, update each state-action pair once per sweep, and look for the optimal trajectory. However, this may become challenging on large tasks because it may be hugely time and resource-consuming to complete all the sweeps. Thus, an alternative and more efficient approach is to select (also called "sample") a small number of trajectories of the states, actions and rewards from the state-action space. In some embodiments, process 500 may include determining a set of one or more rewards based at least in part on the first set of trajectories (block 510). As described above, the training of the student model may include the training of a value network, according to some embodiments. In some embodiments, reinforcement learning 200 may train the value network V, in a supervised mode, e.g., based on a least square approach. In some embodiments, process 500 may include updating a value approximation (e.g., a value function) of the student model based at least in part on the set of determined rewards (block 515). In some embodiments, the rewards with respect to the value function may be determined from the trajectories obtained based at least in part on a policy of a student model. For instance, as described above, the sampled rewards in a trajectory may be added altogether and the sum may be considered as "true values" of the expected rewards for the corresponding states and/or state-action pairs in the trajectory. In some embodiments, the value network $V_v$ may be trained to update the parameter v to fit the "true values," e.g., based on least square errors between the predicted rewards from the value network and the "true values" determined from the sample trajectories.

In some embodiments, process 500 may include determining a set of one or more advantage estimates based at least in part on the first set of trajectories and the value approximation of the student model (block 520). As described above, in some embodiments, advantage estimates Â may be determined based at least in part on trajectories obtained following the policy of the student model (e.g., according to equation (5)) and a value approximation of the student model (e.g., according to equation (4)). In some embodiments 500 may include determine a loss representing a difference between the policy of the student model and a policy of a teacher model based at least in part on the first set of trajectories and advantage estimates (block 525). As described above, the loss (e.g., $L_{distill}$) representing a cross-entropy of the policies of the student and teacher models may be determined according to equations (9) and (6), according to some embodiments. In some embodiments, process 500 may include updating the policy of the student model based at least in part on the loss (block 530). For instance, as described above, in the representation transfer, a policy loss may be calculated based at least in part on the loss representing the difference between the policies of the teacher and student models in the representation transfer (e.g., $L_{RL}$ according to equation (10)), and the parameters θ of the policy of the student model may be updated according to the calculated policy loss (e.g., based on a gradient ascent of $L_{RL}$ with respect to parameters θ), according to some embodiments.

In some embodiments, process 500 may include obtaining a second set of one or more trajectories based at least in part on the policy of the teacher model (block 535). As described above, in instance transfer, samples of the inputs and/or outputs of the teacher model may be obtained by sampling the trajectories following the policy of the teacher model, according to some embodiments. In some embodiments, process 500 may include determining a second set of one or more advantage estimates based at least in part on the second set of trajectories and the value approximation of the student model (block 540). As described above, advantage estimates Â may be determined based at least in part on trajectories obtained following the policy of the teacher model (e.g., according to equation (5)) and a value approximation of the student model (e.g., according to equation (4)). In some embodiments, process 500 may include select some of the second set of advantage estimates based at least in part on a filter criterion (block 545). As described above, individual ones of the second set of advantage estimates may be compared with the filter criterion, e.g., a threshold, and those that have values larger than the threshold be selected to implement the instance knowledge transfer. In some embodiments, process 500 may include updating the policy of the student model based at least in part on the second set of advantage estimates (block 550). For instance, as described above, in the instance transfer, a policy loss may be calculated based at least in part on the loss representing the difference between the policies of the teacher and student models in the representation transfer (e.g., $L_{clip}$ according to equation (6)), and the parameters B of the policy of the student model may be updated according to the calculated policy loss (e.g., based on a gradient ascent of $L_{clip}$ with respect to parameters θ), according to some embodiments. Thus, according to the above descriptions, the operations as indicated in blocks 505-530 may perform the update of the policy network of the student model with representation transfer as well as the update of the value network of the student model, whilst the operations as indicated in blocks 535-550 may perform the update of the policy network of the student model with instance transfer.

Figure 6:
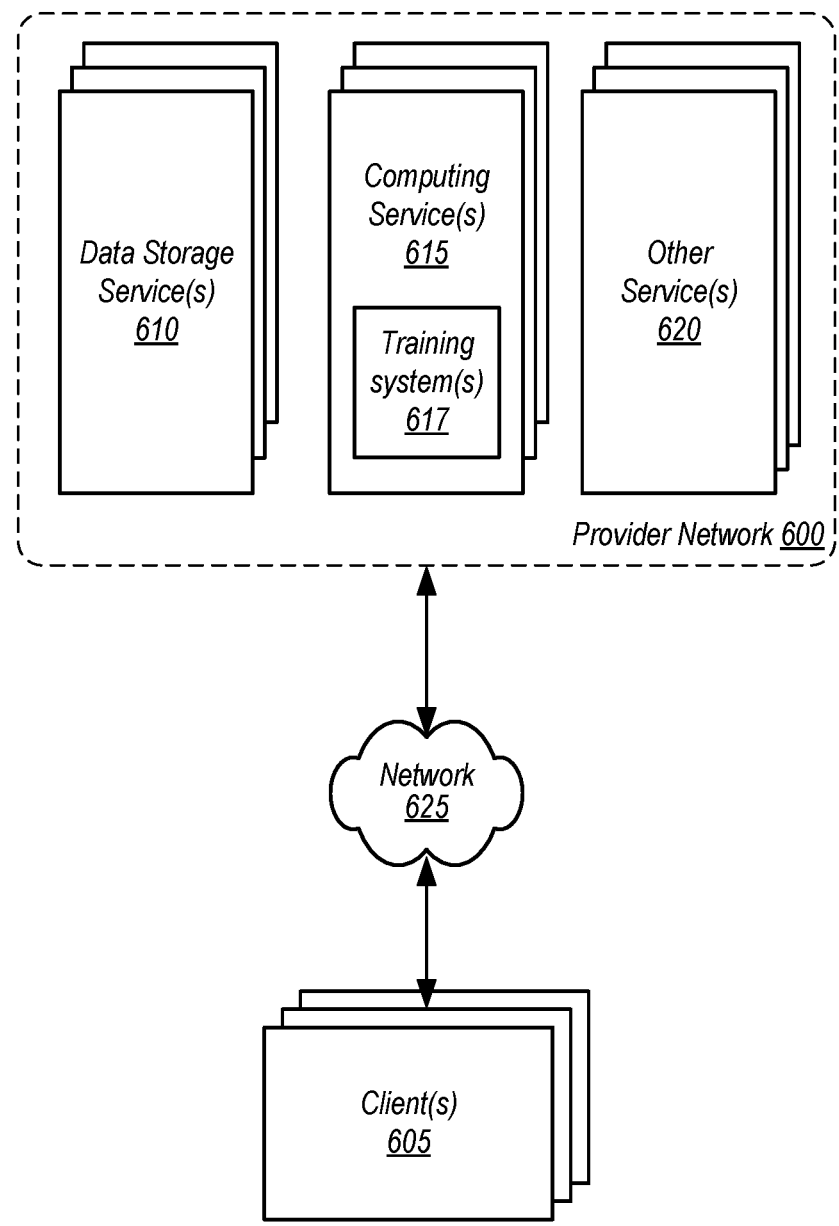
FIG. 6 is a block diagram showing an example provider network that provides network-accessible computing service to implement training of machine learning models, according to some embodiments.

FIG. 6 shows an example provider network that provides network-accessible computing service to implement training of machine learning models, according to some embodiments. In FIG. 6, provider network 600 may be a private or closed system or may be set up by an entity such as a company or a public sector organization to provide one or more services (such as various types of cloud-based storage) accessible via the Internet and/or other networks to one or more client(s) 605. Provider network 600 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by provider network 600. In some embodiments, provider network 600 may implement various computing resources or services, such as a data storage service(s) 610 (e.g., object storage services, block-based storage services, or data warehouse storage services), computing service 615 that includes a training system 617, as well as other service(s) 620, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 610 may implement different types of data stores for storing, accessing, and managing data on behalf of client(s) 605 as a network-based service that enables one or more client(s) 605 to operate a data storage system in a cloud or network computing environment. For example, data storage service(s) 610 may include various types of database storage services (both relational and non-relational) or data warehouses for storing, querying, and updating data. Such services may be enterprise-class database systems that are scalable and extensible. Queries may be directed to a database or data warehouse in data storage service(s) 610 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 610 may also include various kinds of object or file data stores for putting, updating, and getting data objects or files, which may include data files of unknown file type. Such data storage service(s) 610 may be accessed via programmatic interfaces (e.g., APIs) or graphical user interfaces. Data storage service(s) 610 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, provider network 600 may provide computing service(s) 615 as a network-accessible service to implement training of various machine learning models. In some embodiments, computing service(s) 615 may include training system(s) 617 (e.g., training system 110 in FIG. 1) that may be implemented at the computing resources offered as part of computing service(s) 615. Client(s) 605 may access computing service(s) 6615 through network 625 to request generation and training of a machine learning model (e.g., a student model). In response, computing service(s) 615 may use training system(s) 617 to identify one or more teacher models that are stored at one or more storage resources (e.g., model repository 105 in FIG. 1) as part of computing service(s) 615 or part of data storage service(s) 610 of provider network 600. As described above, the teacher models may be identified based on characteristics representing similarities of the teacher models with respect to the student model. Training system(s) 617 may transfer knowledge from the identified teacher models to the student model. As described above, the knowledge transfer may include a combination of representation transfer and instance transfer. In some embodiments, the representation transfer and instance transfer may be performed alternatingly. In some embodiments, the instance transfer may include a filter that selectively transfer knowledge from filtered instances to the student model. With the transferred knowledge, training system 617 may train the student model, e.g., to update the respective parameters of a policy network and/or a value network o the student model, as described above.

Other service(s) 620 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 610. Various other distributed processing architectures and techniques may be implemented by data processing services (e.g., grid computing, sharding, distributed hashing, etc.). Note that in some embodiments, data processing operations may be implemented as part of data storage service(s) 610 (e.g., query engines processing requests for specified data).

Generally speaking, client(s) 605 may encompass any type of client configurable to submit network-based requests to provider network 600 via network 625, including requests for storage services (e.g., a request to create, read, write, obtain, or modify data in data storage service(s) 610, a request to create and train a machine learning model at computing service(s) 615, etc.). For example, a given client 605 may include a suitable version of a web browser, or may include a plug-in module or other type of code module configured to execute as an extension to or within an execution environment provided by a web browser. Alternatively, a client 605 may encompass an application such as a database application (or user interface thereof), a media application, an office application or any other application that may make use of storage resources in data storage service(s) 610 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 605 may be an application configured to interact directly with provider network 600. In some embodiments, client(s) 605 may be configured to generate network-based services requests according to a Representational State Transfer (REST)-style network-based services architecture, a document- or message-based network-based services architecture, or another suitable network-based services architecture.

In various embodiments, network 625 may encompass any suitable combination of networking hardware and protocols necessary to establish network-based-based communications between client(s) 605 and provider network 600. For example, network 625 may generally encompass the various telecommunications networks and service providers that collectively implement the Internet. Network 625 may also include private networks such as local area networks (LANs) or wide area networks (WANs) as well as public or private wireless networks. For example, both a given client 605 and provider network 600 may be respectively provisioned within enterprises having their own internal networks. In such an embodiment, network 625 may include the hardware (e.g., modems, routers, switches, load balancers, proxy servers, etc.) and software (e.g., protocol stacks, accounting software, firewall/security software, etc.) necessary to establish a networking link between given client 605 and the Internet as well as between the Internet and provider network 600. It is noted that in some embodiments, client(s) 605 may communicate with provider network 600 using a private network rather than the public Internet.

Figure 7:
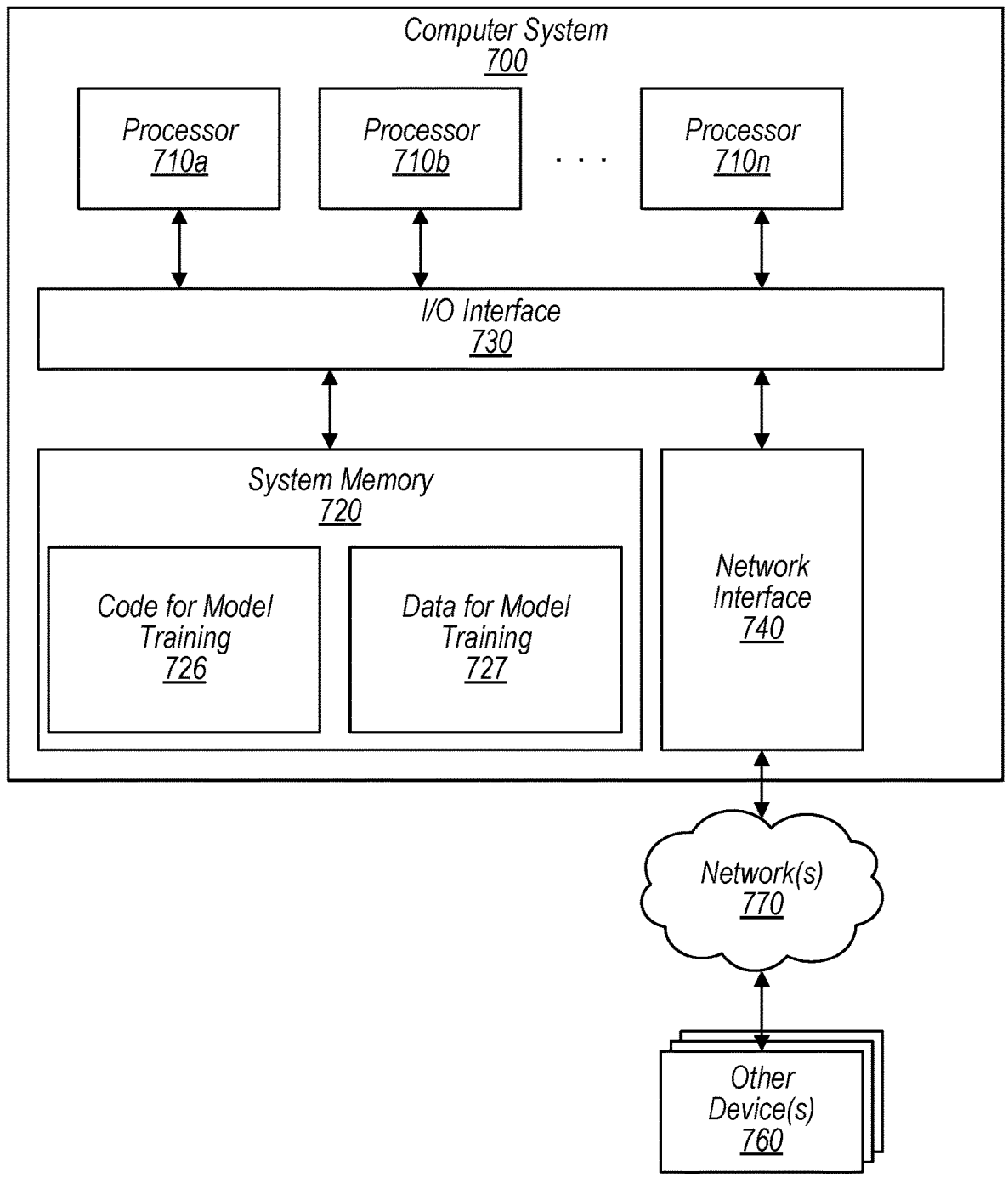
FIG. 7 is a block diagram showing an example computing system to implement the various techniques described herein, according to some embodiments.

FIG. 7 shows an example computing system to implement the various techniques described herein, according to some embodiments. For example, in one embodiment, computing service 100 (and training system 115) may be implemented by a computer system, for instance, a computer system as in FIG. 7 that includes one or more processors executing program instructions stored on a computer-readable storage medium coupled to the processors. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be one embodiment of a computer-accessible medium configured to store instructions and data accessible by processor(s) 710. In various embodiments, system memory 720 may be implemented using any non-transitory storage media or memory media, such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740. In the illustrated embodiment, program instructions (e.g., code) and data implementing one or more desired functions, as described above in FIGS. 1-6, are shown stored within system memory 730 as code 726 and data 727.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fiber Channel SANs, or via any other suitable type of network and/or protocol.

In some embodiments, system memory 720 may be one embodiment of a computer-accessible medium configured to store program instructions and data as described above for FIG. 1-6. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
   one or more processors; and
   a memory storing program instructions that, when executed by the one or more processors, cause the one or more processors to:
     obtain a first set of one or more trajectories based at least in part on a policy of a student reinforcement learning (RL) model;
     determine a loss representing a difference between the policy of the student RL model and a policy of a teacher RL model based at least in part on the first set of one or more trajectories;
     obtain a second set of one or more trajectories based at least in part on the policy of the teacher RL model; and
     determine a set of one or more advantage estimates based at least in part on the second set of one or more trajectories and a value approximation of the student RL model; and
     update the policy of the student RL model using the loss and the set of one or more advantage estimates, wherein one or more updates of the policy of the student RL model using the loss are performed alternatingly with one or more updates of the policy of the student RL model using the set of one or more advantage estimates.

2. The system of claim 1, wherein to determine the set of one or more advantage estimates, the program instructions cause the one or more processors to select some of the set of one or more advantage estimates based at least in part on a filter criterion, and wherein the selected some of the set of one or more advantage estimates are used to perform the updates of the policy of the student RL model.

3. The system of claim 1, wherein to update the policy of the student RL model, the program instructions cause the one or more processors to alternate the updates of the policy of the student RL model using the loss with the updates of the policy of the student RL model using the set of one or more advantage estimates according to a duty cycle.

4. The system of claim 1, wherein the one or more processors and the memory are implemented as part of a network-accessible machine learning service offered by a provider network, and wherein the student RL model and the teacher RL model are stored at one or more storage resources that are part of the machine learning service or one or more storage resources that are part of a data storage service offered by the provider network.

5. A method, comprising:
   determining a loss representing a difference between a policy of a first machine learning model and a policy of a second machine learning model based at least in part on a first set of one or more trajectories obtained with the policy of the first machine learning model;
   determining a set of one or more advantage estimates based at least in part on a second set of one or more trajectories obtained with the policy of the second machine learning model and a value approximation of the first machine learning model; and
   updating the policy of the first machine learning model using the loss and the set of one or more advantage estimates, wherein one or more updates of the policy of the first machine learning model using the loss are performed alternatingly with one or more updates of the policy of the first machine learning model using the set of one or more advantage estimates.

6. The method of claim 5, wherein determining the set of one or more advantage estimates comprises selecting some of the set of one or more advantage estimates based at least in part on a filter criterion, and wherein the selected some of the set of one or more advantage estimates are used for the updating of the policy of the first machine learning model.

7. The method of claim 5, wherein updating the policy of the first machine learning model comprises alternatingly performing the updates of the policy of the first machine learning model using the loss and the set of one or more advantage estimates according to a specific duty cycle.

8. The method of claim 5, wherein determining the loss comprises determining a second set of one or more advantage estimates based at least in part on the first set of one or more trajectories obtained with the policy of the first machine learning model and the value approximation of the first machine learning model, and wherein updating the policy of the first machine learning model further comprises updating the policy of the first machine learning model based at least in part on the second set of one or more advantage estimates.

9. The method of claim 5, further comprising:
determining a set of one or more rewards based at least in part on the first set of one or more trajectories obtained with the policy of the first machine learning model; and
updating the value approximation of the first machine learning model based at least in part on the set of one or more rewards.

10. The method of claim 5, further comprising:
identifying the second machine learning model based at least in part on one or more characteristics representing a similarity of the second machine learning model with respect to the first model.

11. The method of claim 5, further comprising:
determining another loss representing a difference between the policy of the first machine learning model and a policy of a third machine learning model based at least in part on the first set of one or more trajectories obtained with the policy of the first machine learning model; and
determining another set of one or more advantage estimates based at least in part on a third set of one or more trajectories obtained with the policy of the third machine learning model and the value approximation of the first machine learning model,
updating the policy of the first machine learning model using the other loss and the other set of one or more advantage estimates.

12. The method of claim 5, wherein the determining the loss, the determining the set of one or more advantage estimates, and the respectively updating the policy are performed by a network-accessible computing service offered by a provider network, and wherein the first machine learning model and the second machine learning model are stored at one or more storage resources that are part of the computing service or a data storage service offered by the provider network.

13. One or more non-transitory, computer readable media, storing program instructions that, when executed on or across one or more computing devices, cause the one or more computing devices to implement:
determining a loss representing a difference between a policy of a first machine learning model and a policy of a second machine learning model based at least in part on a first set of one or more trajectories obtained with the policy of the first machine learning model;
determining a set of one or more advantage estimates based at least in part on a second set of one or more trajectories obtained with the policy of the second machine learning model and a value approximation of the first machine learning model; and
updating the policy of the first machine learning model using the loss and the set of one or more advantage estimates, wherein one or more updates of the policy of the first machine learning model using the loss are performed alternatingly with one or more updates of the policy of the first machine learning model using the set of one or more advantage estimates.

14. The one or more non-transitory, computer readable media of claim 13, wherein in determining the set of one or more advantage estimates, the program instructions cause the one or more computing devices to implement selecting some of the set of one or more advantage estimates based at least in part on a filter criterion, and wherein the selected some of the set of one or more advantage estimates are used to perform the updates of the policy.

15. The one or more non-transitory, computer readable media of claim 13, wherein in updating the policy of the first machine learning model, the program instructions cause the one or more computing devices to implement alternatingly performing the updates of the policy of the first machine learning model using the loss and the set of one or more advantage estimates according to a specific duty cycle.

16. The one or more non-transitory, computer readable media of claim 13, wherein in determining the loss, the program instructions cause the one or more computing devices to implement determining a second set of one or more advantage estimates based at least in part on the first set of one or more trajectories obtained with the policy of the first machine learning model and the value approximation of the first machine learning model, and wherein in updating the policy of the first machine learning model, the program instructions cause the one or more computing devices to further implement updating the policy of the first machine learning model based at least in part on the second set of one or more advantage estimates.

17. The one or more non-transitory, computer readable media of claim 13, further comprising program instruction that, when executed on or across the one or more computing devices, cause the one or more computing devices to implement:
determining a set of one or more rewards based at least in part on the first set of one or more trajectories obtained with the policy of the first machine learning model; and
updating the value approximation of the first machine learning model based at least in part on the set of one or more rewards.

18. The one or more non-transitory, computer readable media of claim 13, further comprising program instruction that, when executed on or across the one or more computing devices, cause the one or more computing devices to implement:
identifying the second machine learning model based at least in part on one or more characteristics representing a similarity of the second machine learning model with respect to the first model.

19. The one or more non-transitory, computer readable media of claim 13, further comprising program instruction that, when executed on or across the one or more computing devices, cause the one or more computing devices to implement:
determining another loss representing a difference between the policy of the first machine learning model and a policy of a third machine learning model based at least in part on the first set of one or more trajectories obtained with the policy of the first machine learning model; and
determining another set of one or more advantage estimates based at least in part on a third set of one or more trajectories obtained with the policy of the third machine learning model and the value approximation of the first machine learning model,
updating the policy of the first machine learning model using the other loss and the other set of one or more advantage estimates.

20. The one or more non-transitory, computer readable media of claim 13, wherein the one or more computing devices are implemented part of a network-accessible computing service offered by a provider network, and wherein the first machine learning model and the second machine learning model are stored at one or more storage resources that are part of the computing service or a data storage service offered by the provider network.

* * * * *